Feb. 19, 1957  C. W. KULIG  2,781,575
APPARATUS FOR ASSEMBLING LIQUID
DISPENSING CONTAINER ELEMENTS
Filed Jan. 9, 1952  4 Sheets-Sheet 1
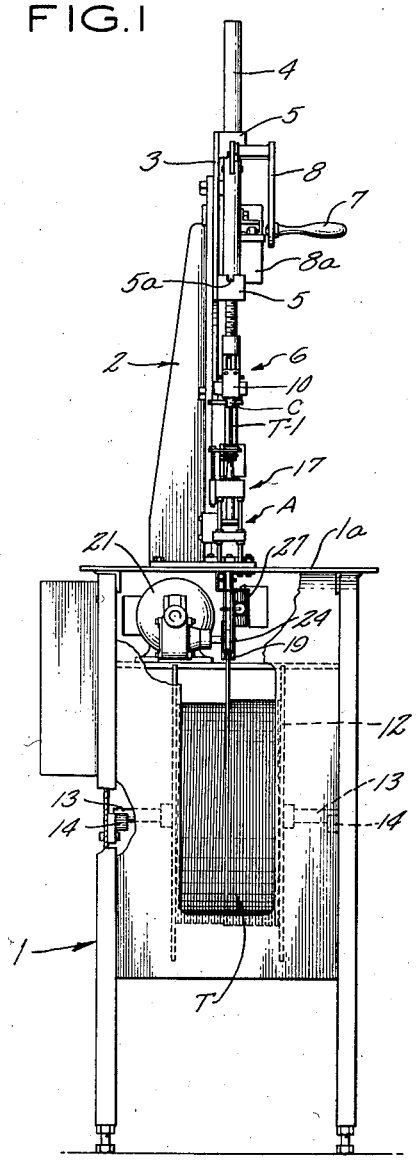
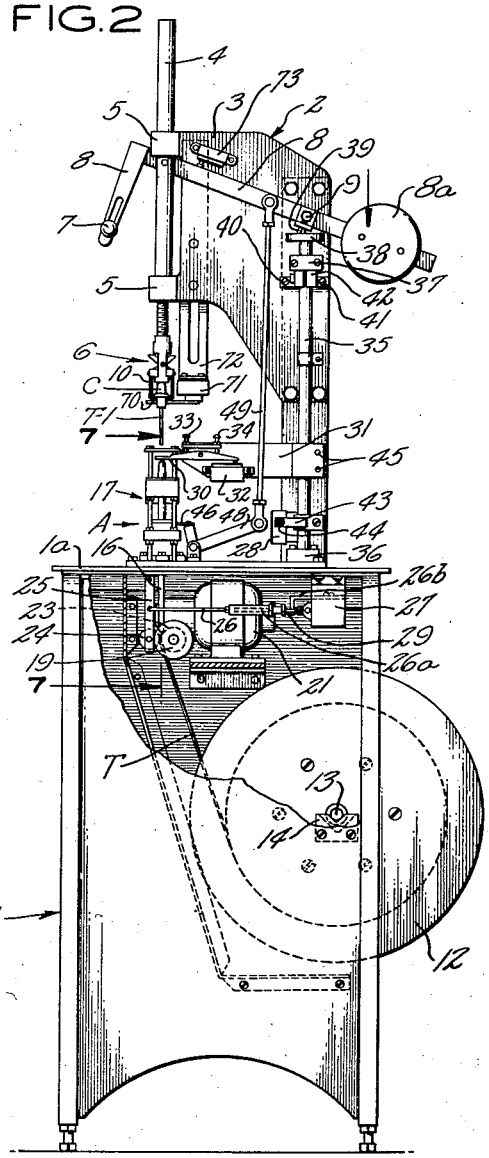
INVENTOR
CONSTANTINE W. KULIG
BY Parham & Bates
ATTORNEYS Feb. 19, 1957
C. W. KULIG
2,781,575
APPARATUS FOR ASSEMBLING LIQUID
DISPENSING CONTAINER ELEMENTS
Filed Jan. 9, 1952
4 Sheets-Sheet 2
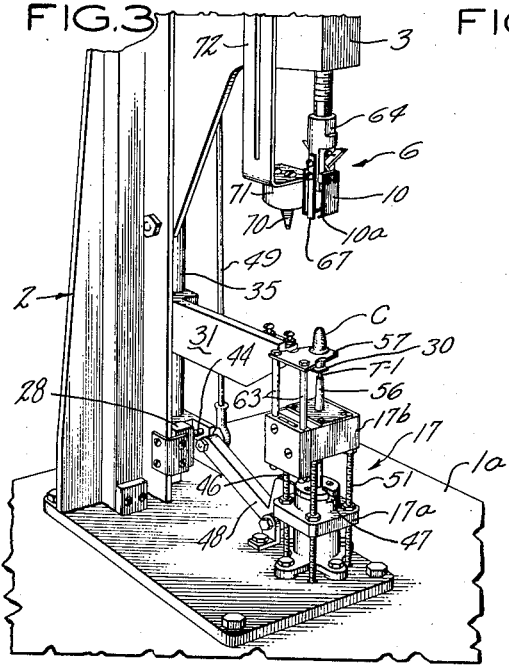
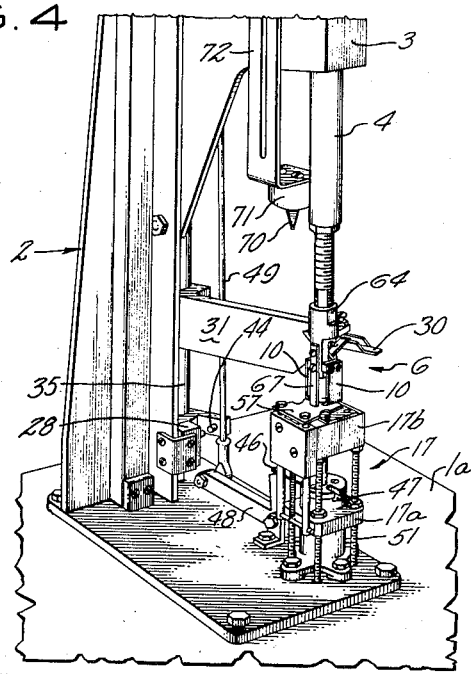
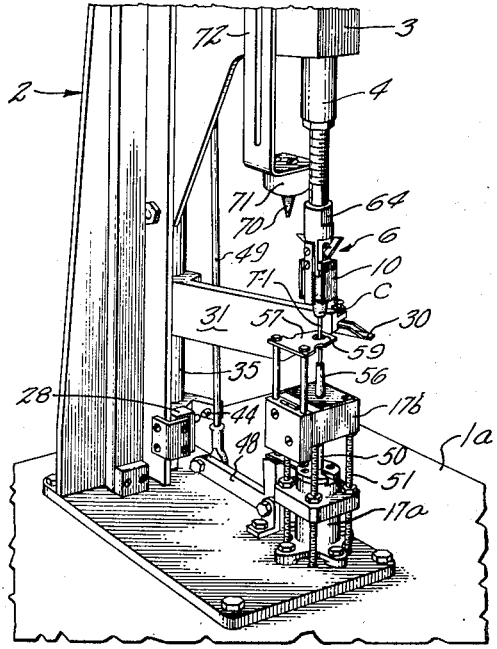
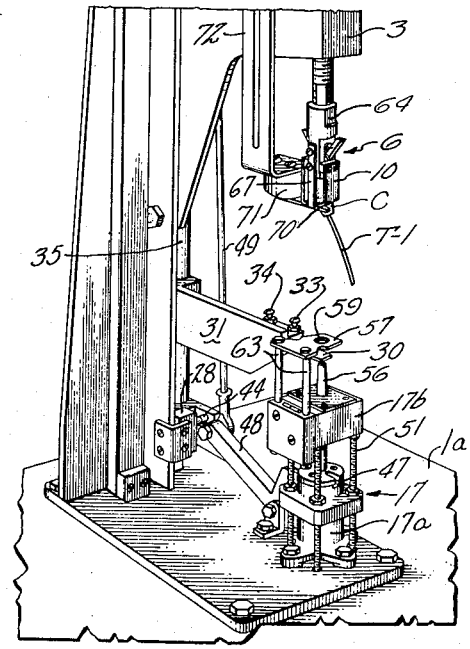
INVENTOR
CONSTANTINE W. KULIG
BY *Parham & Bates*
ATTORNEYS Feb. 19, 1957
C. W. KULIG
2,781,575
APPARATUS FOR ASSEMBLING LIQUID
DISPENSING CONTAINER ELEMENTS
Filed Jan. 9, 1952
4 Sheets-Sheet 3
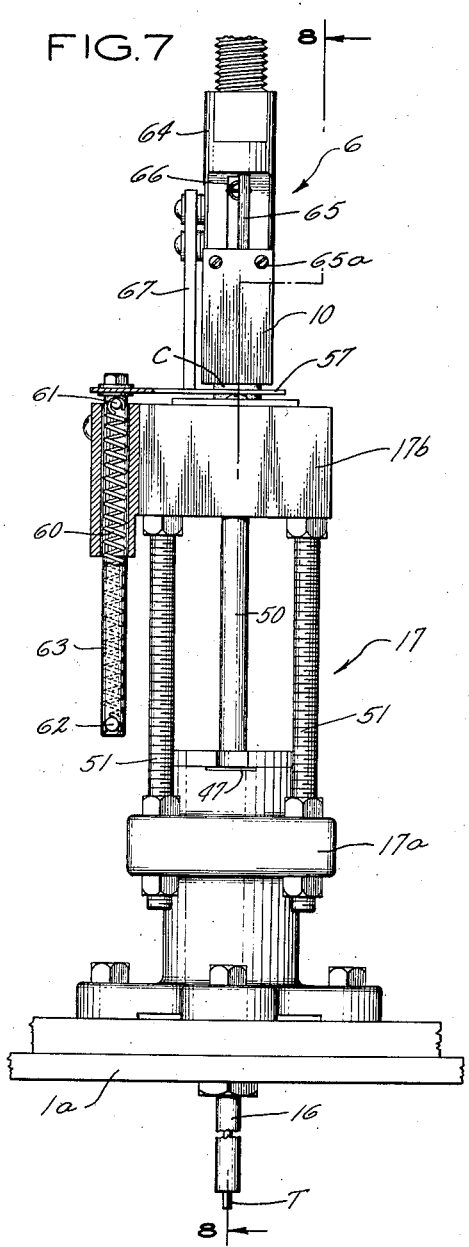
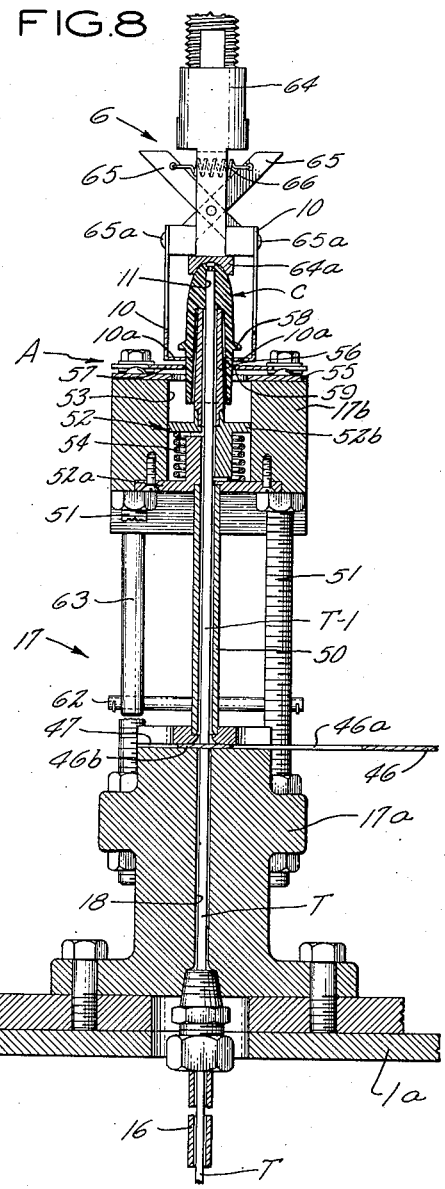
INVENTOR
CONSTANTINE W. KULIG
BY Parham & Bates
ATTORNEYS Feb. 19, 1957
C. W. KULIG
2,781,575
APPARATUS FOR ASSEMBLING LIQUID
DISPENSING CONTAINER ELEMENTS
Filed Jan. 9, 1952
4 Sheets-Sheet 4
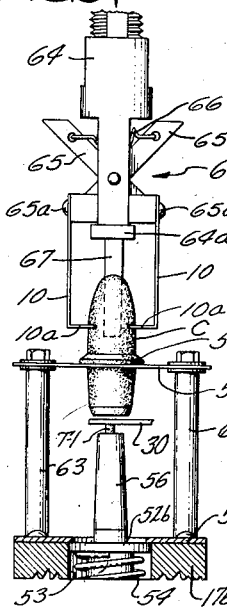
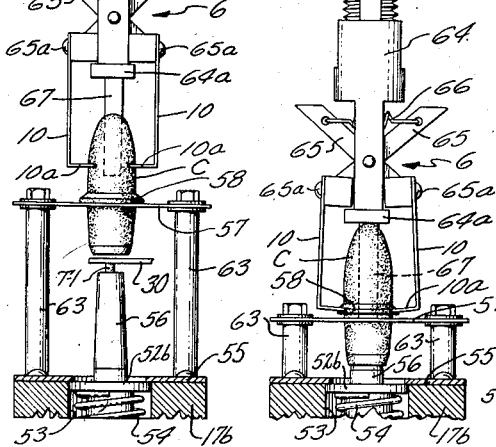
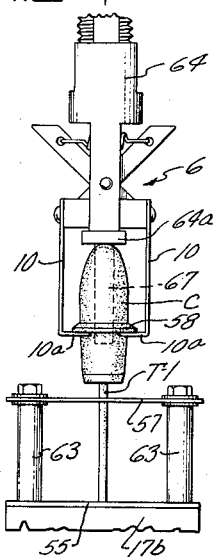
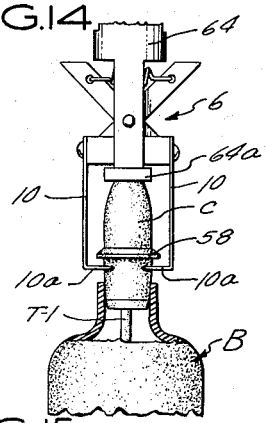
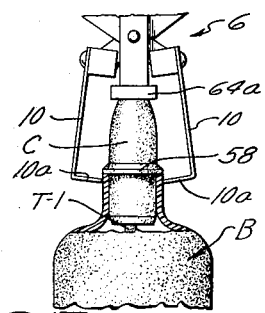
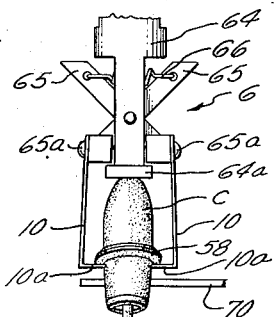
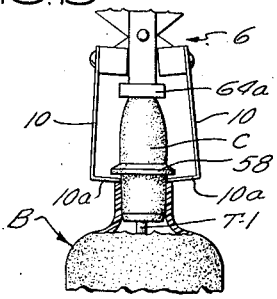
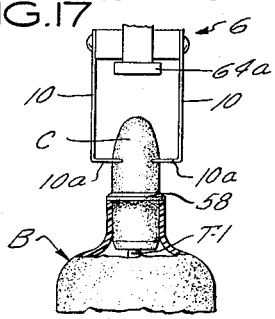
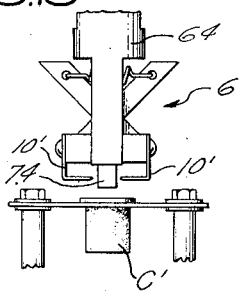
INVENTOR
CONSTANTINE W. KULIG
BY Parham & Bates
ATTORNEYS

United States Patent Office 2,781,575
Patented Feb. 19, 1957

2,781,575

APPARATUS FOR ASSEMBLING LIQUID DISPENSING CONTAINER ELEMENTS

Constantine W. Kulig, Hartford, Conn., assignor to Emhart Manufacturing Company, Hartford, Conn., a corporation of Delaware Application January 9, 1952, Serial No. 265,633

1 Claim. (Cl. 29—235)

The present invention relates to apparatus for assembling the elements of containers for dispensing liquids of various kinds in the form of a spray or jet and more particularly to such containers of the squeezable type which employs tubes of flexible plastic material in connection with a discharge opening in a closure for the container.

The present invention is an improvement over those disclosed in the copending applications, Serial No. 110,926, filed August 18, 1949, now Patent No. 2,706,847 and Serial No. 207,414, filed January 23, 1951, by Frank C. Jennings and assigned to the assignee of this invention.

More particularly, the invention comprises improved tube measuring, cut-off and supporting mechanism cooperating with improved closure gripping mechanism associated in assembling apparatus of the type shown in the copending applications.

The invention further provides apparatus which is readily adjustable to handle a variety of different tube closures.

In the drawings,

Figure 1 is a view in front elevation of tube and closure assembling apparatus embodying the present invention;

Fig. 2 is a view in side elevation of the apparatus shown in Fig. 1;

Figs. 3–6, inclusive, are perspective views of the same portion of the apparatus of Figs. 1 and 2 in successive positions of its operation;

Fig. 7 is an enlarged view partly in section, taken generally on line 7—7 of Fig. 2;

Fig. 8 is a cross-sectional view taken on line 8—8 of Fig. 7;

Figs. 9–13, inclusive, are views of the upper portion of the apparatus shown in Fig. 8 in successive positions of its operations;

Figs. 14–17, inclusive, are views similar to those of Figs. 9–13 and show successive positions of the closure tongs in assembling the closure and a container; and Fig. 18 is a view similar to Fig. 9 with the tongs modified to handle a different closure.

Referring to the drawings and more particularly to Figs. 1 and 2, the apparatus of the present invention comprises a base cabinet generally designated 1 on the table top 1a of which is mounted an upwardly extending frame generally designated 2 having a laterally extending overhang portion 3 in which a plunger 4 is mounted for vertical reciprocal movement over a closure and tube assembling station generally designated A.

The plunger 4 is vertically movable in sleeves 5 of the overhanging frame portion 3 and the lower end of the plunger 4 terminates in a closure-receiving chuck 6. The plunger 4 is movable up and down in the frame sleeves 5 by means of a handle 7 on a lever 8 suitably connected to the plunger 4, and pivotally secured at 9 to the frame 3. As shown in Figs. 1 and 2, the lever 8 is counterbalanced as at 8a so that the plunger 4 can be readily moved up and down by means of the handle 7 to bring the chuck 6 into and out of a position of cooperation with underlying instrumentalities located on the table 1a.

The chuck 6 on the plunger 4 is provided with a pair of clamps 10, in the form of resilient fingers, that are adapted to receive and hold between them the upper portion of a closure C.

The closure C has a central opening 11 for the purpose of receiving a tube T–1 prior to the insertion of the assembled closure C and tube T–1 in a container.

Individual tubes T–1 are adapted to be delivered to the closure and tube assembly station A from a continuous supply of tubing T wound on a spool 12 that is turnable freely on a spindle 13 supported by brackets 14 secured to the base 1. As shown in Figs. 1, 2 and 8, the tubing is conducted into a conduit 16 that extends downwardly from the table into the base and upwardly so as to direct the tubing T into a tube positioning and cutting block 17 which is located at station A. The block 17 has a central opening 18 therein having its axis in exact alignment with the center of the chuck 6 and the plunger 4.

The tubing T from the spool 12 is adapted to be fed into the opening 18 in block 17 by means of an automatically controlled feed mechanism which, as shown in Fig. 2, consists of a roll 19 which is continuously driven by an electric motor 21 when the assembling apparatus is being operated. Preferably the roll 19 rotates at a relatively slow speed, in the neighborhood of 40 R. P. M., the speed being determined by the desired lineal speed at which it is desired to feed tubing T into the tube block 17.

The feed roll 19 has a peripheral V-groove 23 into which the tubing T is adapted to fit tightly so that the rotation of the roll 19 will cause the tubing to be positively fed into the conduit 16 and into the opening 18 of the block 17. The accurate feeding of the tubing during each operating cycle of the apparatus is insured by pressure roll 24 which forces the tubing against the driven roll 19.

In accordance with the invention, the pressure roll 24 is rotatably mounted on the lower end of a lever 25 which is pivoted at its upper end to the table 1a. A connecting rod 26 connects the lever 25 with a solenoid 27 which may be energized by a micro-switch 28 (Figs. 1 and 2) so as to pivot the lever 25 and cause the roll 24 to press the tubing against the feed roll 19 and effect a quick, positive feed of the tubing upward.

The amount of pressure necessary to effect feed is selected by a tension adjustment mechanism 26a having an adjustable knurled screw 29.

As shown in Fig. 2, the connecting rod 26 and tension adjustment mechanism 26a are attached to solenoid 27 and engage with an adjustable stop 26b so that the pressure exerted on the tubing T by the pressure roll 24 is at the threshold between the tube-feed and no-feed when the solenoid 27 is not energized. Thus the tubing T is prevented from slipping back and, at the same time, does not inch forward prior to energization of the solenoid which exerts the substantial pressure necessary for a rapid positive feeding of the tubing.

Control of the feed is effected by a stop lever 30 above the table 1a in the path of the tubing T. As shown in Fig. 2, the lever 30 is pivotally mounted on an arm 31 so that the pressure of tubing against the outer end of the lever 30 causes the other end to actuate a microswitch and relay combination 32 which de-energizes the solenoid 27 and relieves the feeding tension of the roll 24 on the tubing T.

Preferably a pair of adjustment screws 33 and 34 are mounted on the arm 31 to limit the pivotal movement of the lever 30 so that the full load of the tubing is not exerted on the micro-switch 32 and the lever is permitted only a very limited pivotal movement.

In order to move the lever 30 out of line with the tubing, the arm 31 is secured to a vertical shaft 35 which is rotatably journaled in bearings 36 and 37 secured to the table 1a and the frame 2, respectively. Rotation of the shaft 35 to pivot the arm 31 is achieved by a quadrant 38 which is secured to the upper end of the shaft 35 and co-operates with a knob 39 which is secured to the operating lever 8. Thus, when the handle 7 is drawn downward the knob 39 rotates the quadrant 38 and shaft so as to swing the arm 31 and move the lever 30 out of alignment with the tubing T. When the handle 7 is raised, the knob acts on the quadrant 38 so as to pivot the arm 31 back and return lever 30 into alignment with the tubing. Adjustable stop screws 40 and 41 on a block 42 secured to the shaft 35, are adapted to engage the frame 2 and limit the arcuate movement of the shaft and the arm 31.

Another block 43 secured to the lower end of the shaft 35 carries an adjustable screw 44 which engages and closes the normally open micro-switch 28 when the stop lever 30 is swung into alignment with the tubing thus preventing energization of the solenoid 27 and feeding except when the stop 30 is over the tubing. The elevation of the arm 31 on the shaft is adjustable by suitable means, such as clamp screws 45, so that the length of tubing may be readily regulated by adjusting the height of the stop lever 30.

A knife 46 is employed to sever individual lengths T–1 for each closure.

As shown in Figs. 7 and 8, the knife 46 is mounted for reciprocal movement in a transverse slot 47 in the block 17 and, as shown in Fig. 2, is operably secured to a bell crank 48 which is pivoted by movement of operating lever 8 by means of connecting rod 49. When the lever 8 is in the upper portion of its movement, the tubing T may freely pass through a suitable slot 46a (Fig. 8) in the knife. However, when the handle 7 is drawn downward through the lower range of its travel, the blade 46b cuts the tubing T and provides a supporting surface which prevents the cut length T–1 of tubing from moving axially downward when a closure C is forced onto its upper end. The tube T–1 also is supported against substantial lateral displacement when under such pressure. The support for the lower portion of the tube T–1 is provided by a sleeve 50 which is secured at its ends between the two spaced halves 17a and 17b of the block 17 which are secured by four tie bolts 51. It will be apparent that the block may be adapted readily for different lengths of tubing T–1 by selecting sleeves 50 of suitable length.

The upper portion of the tube T–1 is provided with similar lateral support by means of a telescopic guide 52 having a lower portion 52a which is secured to the upper block half 17b, and an upper portion 52b, which is slidably mounted for vertical movement in a bore 53 in the block 17b. The two parts 52a and 52b are yieldably urged apart by a compression spring 54, the upward movement of portion 52b being limited by engagement with the inner rim of a plate 55 having an orifice through which an upper sleeve 56 of the guide part 52b may project. The sleeve 56, as shown in Fig. 8, provides guidance and lateral support for the portion of the tube T–1 which extends into the closure C. The sleeve 56 may be replaced by other sleeves or removed entirely in order to adapt the apparatus to any particular size and shape of closure C.

The block 17 also is provided with a horizontally disposed plate 57 on which the closure is supported as, for example, by its flange 58 with its lower portion extending downwardly into the opening 59. The plate 57 is mounted for vertical movement by means of rods which are slidably journaled in the upper block half 17b. A spring 60 tensioned between a pin 61 recessed in the block 17b and a crossbar 62 fastened to the lower ends of the slide rods 63 yieldably forces the plate 57 to its uppermost position permitted by engagement of the crossbar with the under surface of the block 17b.

Referring more particularly to the closure receiving chuck 6 which presses the closure C onto the end of the tube T–1 and withdraws the assembly from the block 17, the chuck includes a main body portion 64 which is secured, as by threads, to the lower end of the plunger 4. Two lever arms 65 are pivotally secured to the body 64 and are yieldably held in the form of an X as shown in Fig. 8 by their own weight and by a spring 66 tensioned between their upper ends. The lower ends of the arms 65 are provided with blocks to which the resilient clamping fingers 10 are secured, as by means of screws 65a. The ends 10a of the fingers preferably are bent inwardly as shown in the drawings. The bottom of the chuck body 64 includes a recessed pressure foot 64a which preferably is recessed so as to conform to the top contour of the closure C against which it is adapted to press.

The distance between the pressure foot 64a and the tong tips 10a preferably is slightly greater than the height of the closure C from the bottom of the closure flange 58 which supports the closure C on the movable head plate 57 so that the flange and tong tips are separated as shown in Fig. 8 when the pressure foot 64a engages and presses the closure C on the tube T–1.

As best shown in Fig. 7, the movable closure supporting plate 57 is depressed by downward movement of the chuck 6 through engagement of a finger 67 fastened to the chuck body 64. Preferably the finger 67 extends slightly lower than the tongs 10 so that the latter do not engage the closure supporting plate 57.

The operation of the apparatus is as follows:

Assuming the parts to be in the position shown in Fig. 3 at which time a closure C is supported on the movable plate 57 with the tubing T fed upwardly through the block 17 and pressing against stop 30, the operator pulls down the handle 7 thereby lowering the plunger 4 and chuck 6 as shown in Fig. 9.

During the downward travel of the chuck 6, the tong tips 10a engage and are cammed outwardly by the closure C as shown in Fig. 10 and the knob 39 carried by the lever 8 acts to rotate the quadrant 38 and shaft 35 so as to swing the arm 31 and move the tube stop 30 from its position shown in Fig. 3 to the position shown in Fig. 4 where it is out of alignment with the tube T–1, chuck 6 and closure C.

Just prior to movement of the stop 30 from its aligned position, the downward movement of the lever 8 acting through the bell crank 48 and connecting rod 49 causes the knife blade 46b to cut a length T–1 from the tubing T while its upper end is pressed against the stop 30. Immediately thereafter, the screw 44 if properly adjusted opens the microswitch 28 and prevents energization of the tube feeding solenoid 27 while the stop 30 is out of alignment with the tubing.

Thereafter, the finger 67 secured to the member 64 engages and depresses the closure supporting plate 57 against the force of spring 60 thereby lowering the closure C over the upper guide sleeve 56 as shown in Fig. 10. Further downward movement of the chuck 6 and the finger 67 is yieldably resisted by the spring 54 through engagement of the closure C with the sleeve 56 which is supported by the spring. This yieldable resistance raises the closure C off the plate 57 as shown in Fig. 11 and the top of the closure seats in the pressure foot 64a which drives the closure tightly onto the tube T–1 which is supported at its lower end on the knife blade 46b and is supported laterally throughout its length by the block member 17a, sleeves 50 and 56, and the telescopic guide 52. Downward movement is stopped by engagement of the lever 8 with a stop 5a in the lower plunger guide sleeve 5 so that a preselected assembly pressure is always exerted between the closure C and tube length T–1.

Thereafter the handle 7 is raised and the tong fingers 10a of the ascending chuck 6 draws the closure C, in which the tube T–1 has been secured, upwardly as shown in Figs. 5 and 12, while the ascent of the finger 67 permits the tension spring 60 to raise the plate 57 to its upper position as shown in Fig. 9.

When the lower end of the tube T-1 is raised above the elevation of the stop 30, the latter is swung back into its intercepting position relative to the tubing. Immediately thereafter the knife blade 46b is moved inwardly so that the tube passages in the block 17a and sleeve 50 are in a free communication through the slot 46a in the knife preparatory to a tube-feeding operation. Thereupon, the micro-switch 28 is closed by engagement of the control screw 44, thereby energizing the feed solenoid 27 which causes the roll 24 to press the tubing T against the rotating drive pulley 19 so that the tubing is fed rapidly upward against the stop 30. Pressure of the tubing on the stop 30 causes the latter to actuate the micro-switch and relay 32 thereby deenergizing the solenoid 27 and discontinuing feeding of more than the preselected tube length T-1. The non-feeding position of the roll 24 is preferably one which maintains a minimum pressure so that the tube does not either fall back or tend to inch forward.

However, the stop 30 prevents any inching forward, and should the tube drop away from the stop, the micro-switch 32 opens and the solenoid 27 is reenergized to refeed the tube against the stop 30.

The embodiment of the invention shown in Figs. 1-13, inclusive, contemplates that the assembled closure C and tube T-1 be removed from the tong chuck 6 before insertion of the assembly in a bottle or other container.

Removal is effected automatically by a kick-out lever 70 of an electrically actuatable mechanism 71 which is positioned at the upper elevation of the chuck travel by means of a bracket 72 adjustably secured to the frame 2. As shown in Fig. 2, a micro-switch 73 fastened to the frame 2 is closed by the lever 8 at its uppermost position which energizes the kick-out mechanism 71 and causes the lever 70 to knock the closure C from the chuck as shown in Figs. 6 and 13.

In the modification shown in Figs. 14-17, the chuck 6 is used to insert the closure C and tube T-1 assembly in a bottle B, the operation being apparent from the drawings.

As heretofore pointed out, apparatus embodying the present invention may be readily adapted to a wide variety of closure shapes and sizes. Fig. 18 shows a modified closure C' for which the chuck fingers are modified, as shown at 10', and with which modified pressure foot 74 is used. It also should be understood that the sleeve 56 shown in Fig. 8 must be removed and may, if desired, be replaced with a shorter sleeve (not shown) for the closure C'.

As also previously pointed out, the sleeve 50 of Fig. 8 may be lengthened or shortened to provide for the cut-off of a longer or shorter tube T-1, as may be required.

Having thus described the invention, I claim:

A device for assembling a closure to a flexible tube comprising a base, a tube support means resiliently mounted on said base for supporting flexible tubing against flexure of a straight length and for resiliently arresting the motion of a closure in assembly position, a closure support resiliently mounted on said base coaxial with said tube support, a closure pusher means mounted coaxial with said closure holder, means on said pusher for moving said closure holder axially toward said tube support and gripper means mounted on said pusher for removing said closure from said holder, said means for moving said closure holder being of sufficient length to move the closure holder axially away from a closure toward said base when the movement of a closure is arrested by the tube support.

References Cited in the file of this patent

UNITED STATES PATENTS

| | | |
|---|---|---|
| 1,681,829 | Wesseler | Aug. 21, 1928 |
| 2,068,107 | Nygard | Jan. 19, 1937 |
| 2,431,279 | Remington | Nov. 18, 1947 |
| 2,510,878 | Fairbairn | June 6, 1950 |
| 2,551,652 | Vreeland | May 8, 1951 |
| 2,706,847 | Jennings | Apr. 26, 1955 |